US011560127B2

(12) United States Patent
Galea et al.

(10) Patent No.: US 11,560,127 B2
(45) Date of Patent: Jan. 24, 2023

(54) DEVICE FOR A BRAKE PEDAL FORCE-TRAVEL EMULATOR WITH FORCE AND DISPLACEMENT SENSOR AND CORRESPONDING PROCESS

(71) Applicant: Methode Electronics Malta Ltd., Mriehel (MT)

(72) Inventors: Alexander Galea, Dingli (MT); Julius Beck, Munich (DE); Allen Carl Bonnici, Mosta (MT)

(73) Assignee: Methode Electronics Malta Ltd., Mriehel (MT)

( * ) Notice: Subject to any disclaimer, the term of this patent is extended or adjusted under 35 U.S.C. 154(b) by 333 days.

(21) Appl. No.: 16/883,146

(22) Filed: May 26, 2020

(65) Prior Publication Data
US 2020/0377066 A1 Dec. 3, 2020

(30) Foreign Application Priority Data

May 27, 2019 (DE) ...................... 10 2019 114 199.0

(51) Int. Cl.
*G01L 5/22* (2006.01)
*B60T 8/32* (2006.01)
*B60T 7/04* (2006.01)
*B60T 8/40* (2006.01)
*G05G 1/38* (2008.04)
*B60T 8/88* (2006.01)

(52) U.S. Cl.
CPC .............. *B60T 8/326* (2013.01); *B60T 7/042* (2013.01); *B60T 8/409* (2013.01); *G01L 5/225* (2013.01); *G05G 1/38* (2013.01); *B60T 8/885* (2013.01); *B60T 2220/04* (2013.01)

(58) Field of Classification Search
CPC ...... B60T 8/409; B60T 8/4086; B60T 8/4081; B60T 8/4072; B60T 2270/82; B60T 2220/04; G05G 1/38; G01L 5/28; G01L 5/282; G01L 5/284; G01L 5/286; G01L 5/288; G01L 5/255; G01L 5/225
See application file for complete search history.

(56) References Cited

U.S. PATENT DOCUMENTS

| 6,367,886 B1 * | 4/2002 | Shaw ..................... B60T 8/4086 303/50 |
| 10,247,578 B2 | 4/2019 | Bonnici et al. |
| 10,906,514 B1 * | 2/2021 | Kim ......................... G05G 5/03 |

(Continued)

FOREIGN PATENT DOCUMENTS

| CN | 108871746 A | 11/2018 |
| DE | 102013209370 A1 | 11/2013 |
| WO | 2018158703 A1 | 9/2018 |

*Primary Examiner* — Bradley T King
(74) *Attorney, Agent, or Firm* — Thompson Coburn LLP

(57) ABSTRACT

Device for a brake travel emulator with at least one integrated sensor, comprising a housing (5), a force sensor (18) both being connected to a middle part of a connection means (4). The force sensor (18) being arranged at a static unit (2), the housing (5) further comprising at least one conical compression spring (6), an axially sliding component (7), a connecting rod (9) comprising a varying diameter geometry, an oscillating means (48) capable of creating an electric field, and a displacement sensor (46), the force sensor (18) further comprising, a micro-controller (50), means for receiving applied force (41) and at least four coils (30, 31, 32, 33).

20 Claims, 8 Drawing Sheets

(56) References Cited

U.S. PATENT DOCUMENTS

Figure 1:
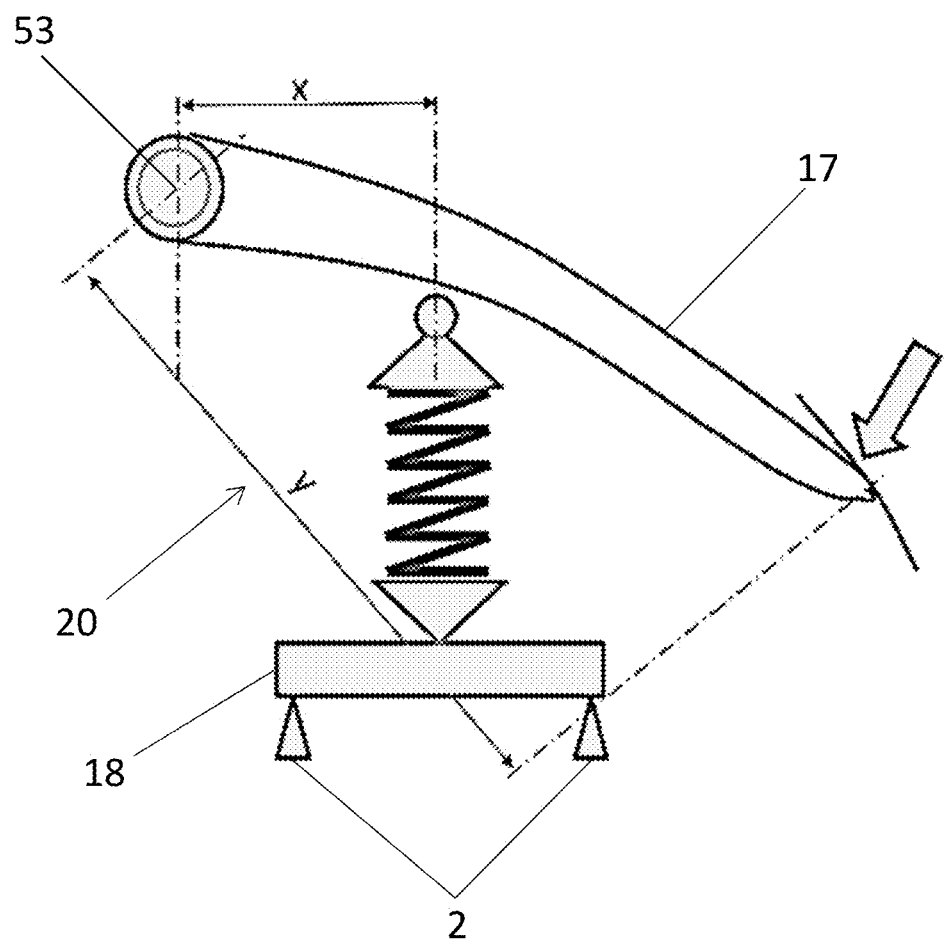

| | | | |
|---|---|---|---|
| 2005/0082909 A1* | 4/2005 | Constantakis | B60T 8/3255 303/20 |
| 2012/0007419 A1* | 1/2012 | Sellinger | B60T 8/409 303/15 |
| 2016/0016567 A1* | 1/2016 | Jürgens | B60T 8/368 303/10 |
| 2018/0037202 A1 | 2/2018 | Pennala et al. | |
| 2018/0093648 A1* | 4/2018 | Pennala | B60T 7/06 |
| 2018/0208162 A1* | 7/2018 | Street | B60T 7/042 |
| 2018/0208163 A1* | 7/2018 | Lee | B60T 7/042 |
| 2018/0274998 A1* | 9/2018 | Sumi | G01L 1/2206 |
| 2019/0232928 A1* | 8/2019 | Adachi | B60T 11/18 |
| 2020/0001711 A1* | 1/2020 | Burke | G05G 5/05 |
| 2020/0023828 A1* | 1/2020 | Fukayama | B60T 13/745 |
| 2020/0353908 A1* | 11/2020 | Street | G05G 1/38 |
| 2021/0070265 A1* | 3/2021 | Roether | B62D 9/005 |

\* cited by examiner

DEVICE FOR A BRAKE PEDAL FORCE-TRAVEL EMULATOR WITH FORCE AND DISPLACEMENT SENSOR AND CORRESPONDING PROCESS

RELATED APPLICATION DATA

This application claims priority to and the benefit of German patent application DE 10 2019 114 199.0 filed on May 27, 2019, the disclosure of which is incorporated by reference herein.

DESCRIPTION

The present disclosure relates to a device for a brake pedal force-travel emulator with at least one integrated sensor and a process of sensing a displacement of a brake pedal and sensing a driver's force applied on a brake pedal.

BACKGROUND

According to the state of the art a brake pedal of a vehicle is usually connected through a push rod to braking hydraulics which builds up pressure when the brake pedal is activated. In this configuration a reaction force profile is provided. This profile can be felt by the driver and thus provides a return force feedback. In addition through sensing or switching elements a position of the pedal is monitored to achieved functions such as brake light switching, ABS/system wake-up, and cruise control cancel function.

Although this technology is known and used for many decades, it has some principle disadvantages which are connected to a slow response to user's commands. The hydraulics does not provide a precise force travel feeling. Sometimes the hydraulic system suffers a loss of hydraulic power due to long hydraulic power lines with limited and delayed diagnostics.

Also mechanical failure can be observed when the system is used for long time.

Thus, it is an object of the disclosure to eliminate common cause mechanical failure.

It is a further object to provide a force transfer element during the use of the brake pedal, which can withstand high forces without damage.

It is another object of the disclosure to minimize sound, which is generated by block and return force.

The disclosure also aims at providing a reliable and robust system and allowing application customization for higher accuracy.

Additionally, the disclosure intends to provide a redundant brake signal transfer.

Further on, it is intended to be able to directly measure the displacement of the brake pedal during its activation.

Another aspect is to provide a system which is capable of measuring the displacement of the brake pedal when being activated as well as measuring the force applied to the brake pedal by the user simultaneously.

A further intention is that the system is capable of precisely identifying any position of the brake pedal when being used, i.e. any position between the rest position and an application of a full power brake.

Finally, it is intended to provide a system which avoids failure and which provides a LIMP HOME mode solution to the driver as well as to avoid the effect of metallic debris during long lasting use of the brake system.

These various aspects are solved by a device for a brake pedal force-travel emulator with at least one integrated sensor and with a process of sensing a displacement of a brake pedal and sensing a driver's force applied on the brake pedal.

SUMMARY OF THE DISCLOSURE

The device for the brake travel emulator comprises a device with a housing, which is in the application also called "quasi" floating device or simply floating device, because it is connected via a narrower connection means to at least one force sensor.

This floating device comprises connecting rod, a sliding element, at least one compression spring and at least one displacement sensor, which act together.

The device for the brake travel emulator comprises, thus, at least one force sensor. The component fulfilling the function of the force sensor covers in a preferred embodiment a load pin unit.

At its bottom said force sensor is mounted on a static or stationary unit. The static unit can be fixed to the pedal box base. Alternatively, the static unit can be fixed to the vehicle floor and/or to a firewall panel.

The center of the force sensor as well as the center of the bottom of the "quasi" floating device are connected to each other, i.e. the connection of both the force sensor and the "quasi" floating device is not inclined over their entire surface, being the reason why the device is called a "quasi" floating device or simply a floating device.

The brake pedal is pressed upon by the foot of the driver. Also, the brake pedal is connected to the connecting rod acting together with the sliding element.

Also at least one conical compression spring acts in the floating device, wherein the compression spring has a varying pitch. Also, the compression spring shows a varying diameter along its length.

The "quasi" floating device is adapted as a rigid element. The rigid element transfers the force of the compression spring, being actuated by the movement of the brake pedal via the connecting rod and sliding element, to the load pin unit, whereby the force is applied in the center of the load pin unit.

Thus, stress caused by this transfer of force is applied to the force sensor, which as a result suffers a micro deformation, whereby sufficient strain is generated to measure the force by means of the force sensor.

The connecting rod shows varying diameter geometry along its length. The length of the connecting rod equates preferably the full travel of the device. The connecting rod affects the sliding element by moving it into the direction of the compression spring. The sliding element compresses the compression spring, acting on the free end of said compression spring.

The varying geometry of the connecting rod can have the form of the cone. When traveling, the connecting rod interacts also with an oscillating magnetic field, simultaneously generating varying eddy currents due to its form along the travel of the pedal. This enables the displacement sensor arranged in the floating device to produce a linear position output during moving of the at least one compression spring.

The output generated by the force sensor due to measuring of the above mentioned applied stress is fed into the displacement sensor located in the floating device. The displacement sensor can be formed of at least one PCBA i.e. an assembly of at least one PCB.

The displacement sensor comprises at least one set of planar coils, an oscillator circuit and preferably processing electronics inside the floating device. The displacement sensor itself communicates at least the position of the pedal to a vehicle module.

Alternatively, the output from the force sensor communicates force values directly to a vehicle module. Thus, the displacement sensor signals the position and force of the brake pedal to the vehicle module.

In addition, a damper component is preferably provided; it is made up of a soft material in order to absorb full travel sound and to also provide a sharp feedback force increase in the last few millimeter of travel. Similarly, another soft rubbery component may be provided which acts as a sound damper between the sliding element and the displacement sensor on the release stroke. A flexible bellow component covers the whole assembly and protects it against ingress of foreign matter.

With regard to the interaction of the varying geometry of the connecting rod with an oscillating electric field thus generating varying eddy currents along the travel of the brake pedal reference is made to the entire disclosure of the applicant's U.S. Pat. No. 10,247,578 B2 the disclosure of which is referenced hereto.

Eddy current testing (also referred to as eddy current method) is an electrical method for testing the measuring object or transducer element. During testing, a coil generates a changing magnetic field which induces eddy currents in the material to be tested. When carrying out the measurement, the density of the eddy current is detected by the magnetic field generated by the eddy current, using a sensor which also preferably contains the excitation coil. The parameters measured may be the amplitude and the frequency displacement towards the excitation signal. The eddy current testing is performed, in particular, on the basis of a known magnetic field which is generated by the sensor coil cooperating with a metal element. Since the interaction between the magnetic field and the metal target changes, eddy currents are generated in the metal target, which in turn causes energy loss in the circuit generating a magnetic field. As the energy loss can be measured and the energy loss increases with increasing interaction and thus leads to an increase in eddy currents, the microcontroller, which also controls the excitation circuit, transforms the energy loss value into an approximate value.

The connecting rod according to the disclosure in which the measuring object/transducer element has in this respect a varying geometry.

In a particularly preferred embodiment, the connecting rod has an area with a continuous transition from a small diameter to a larger diameter, thus enabling a quasi-analogue determination of position.

Especially the conical design involves a substantial advantage, because the arrangement enables sensing, detecting or measuring by means of an axial motion, without the sensing process being affected or even being disturbed by vibrations or unfavorable factors in other directions other than axial movement.

This means that the connecting rod is present in the area of the sensor coil but, in contrast to the coil, can change its position by performing an axial motion and, in contrast to the coil, thus changes in cross section. For this reason, a conical design is advantageous.

In the sense of the present application the expression "sensor" has the meaning of an physical unit which is capable of detecting changes in field strength, such as caused by a moving measuring object, by means of a measuring coil arrangement. The term is understood to mean, in particular, a sensing element, a pickup, a measuring element, a detector, a probe, although this is not intended as a limitation.

Sensor coil means: a part which is composed of a plurality of partial windings and/or layers and which generates the magnetic field required for the purposes of measuring preferably in cooperation with an oscillator. Preferably, it is made from copper.

Microcontroller means: an electronic circuit which substantially combines functions of an oscillator for the excitation of an oscillating circuit, a voltage regulator, an evaluation circuit as well as an output and protection circuit.

Planar means: a feature of the coil and/or its layers when being substantially flat, plane, preferably even, straight, smooth, non-corrugated.

The expression "measured" equates to the expression "sensed".

The expression "electric field" equates to the expression of the "magnetic field". In practice both expressions are often used parallel.

Thus the disclosure makes it possible to provide a force generator which acts on the force sensor. Since the force has to vary with the travel of the brake pedal an actuator may be integrated and may be linked to the moving pedal.

The compression spring design already provides a basic feel trend without needing any adjustment. The spring force can be measured directly. The displacement of the compression spring can be directly measured using eddy current sensing.

The components which are brought into touch with the force transfer can withstand high values of pedal force without damage.

The embodiment which preferably provides rubber end stops acts in addition to minimize block and return force generated sound, i.e. the end stops lower sound frequency and therefore increase the quality perception.

The force sensor, especially the load pin unit, is hermetically sealed with options of either a fly-lead or integrated sealed connector. The components of eddy current sensing and main electronics are sealed within the housing and communicating through a sealed connector.

All moving parts are protected against dust, particle and direct fluids, preferably through a flexible rubber bellow.

The eddy current solution is highly reliable and was tested to 150 deg C. in a metallic and magnetic environment, thus providing an absolute robust system.

The providing of a couple planar coils, preferably in the configuration of pickup coils etched directly on the PCB reduces a part to part variation and allows and application customization for higher accuracy.

The arrangement of the sensor around the connecting rod preferably in the configuration of moving cone produces a very stable linear position output irrelevant of movement and vibrations in all other directions.

The system of the disclosure is immune to the situation and the surroundings including magnetic fields.

It is a preferable configuration that the force output of the load pin unit is fed into the displacement sensor, which uses the eddy current technology and therefore capable to provide an absolute position of the brake pedal and of the compression spring and the force of the brake pedal either via analogue, or PWM output or other customer defined protocol.

The system used for sensing direct linear motion makes use of a varying diameter geometry of the connecting rod, more preferably makes use of a cone configuration of the connecting rod, moving axially inside a uniform oscillating field around it. Such a system is completely immune to tilting effects of the varying geometry of the connecting rod, particularly of the cone configuration around the axis of rotation and also to lateral movements due to vibrations.

The system avoids the use of magnets and attracts no metallic debris.

In case of the preferred embodiment using two conical springs working in parallel both, the total force and profile required to achieve the specified force at the foot are required. Preferably both of the springs are designed from different material diameters and can both achieve an excess of 10 million cycles.

Preferably also a collapsible hard rubber stopper can be used which supports the last portion of travel, i.e. a sudden increase on force, and also protects the springs against travel beyond undue forces.

This configuration using two conical springs even more ensures full redundancy and eliminates common cause mechanical failure.

In case two independent coils are used the module can be driven by separate controls and an offset by known distance along the shape of the connecting rod is possible. Such offset which preferably is calibrated per sensor at the EOL (end of line) is a diagnostic measure for the integrity of the coils and the varying shape of the connecting rod since the offset has to remain constant.

Continuous sensing on dual but different and complimenting coils broadens the safety potential of the architecture of the at least one micro controller always knows the precise position of the compressed coils and the actual moving of the connecting rod and no unknown states are present.

DETAILED DESCRIPTION

The present disclosure relates to a force travel feel emulator with at least one integrated force and/or displacement sensor, preferably with integrated force and displacement sensors. Compared to the state of the art the hydraulics system acting upon the brake pedal is no longer needed. The brake pedal movement and the driver's force applied to the pedal are used to determine the driver's actuation onto the brake pedal in order to decelerate the vehicle. The corresponding system will be described in more detail now.

Contrary to the known state of the art, the pedal feel emulation is being replicated without having a power brake booster/master cylinder. It allows direct sensing both of the displacement of the pedal and of the force applied onto the brake pedal by means of the foot of the driver. The displacement sensing, i.e. the sensing of the distance travel of the brake pedal, is ensured without redundant outputs.

In an embodiment of the invention, the radial movement of the brake pedal pivoting around a pivot axis is turned into a linear movement, which will be sensed by the force travel feel emulator as described in more detail below.

The force travel feel emulator comprises a static unit, which is arranged adjacent to the force sensor and nearest either to a box base, which comprises the brake pedal, or to the floor of the car chassis. The static unit allows the measurement of the physical constraint delivered to the force sensor via the floating device.

The force sensor may be constructed in any appropriate way. According to a preferable embodiment the sensor is a load pin unit.

Following the invention a force generator is provided to act on the force sensor. Since the force varies with the travel of the brake pedal, the configuration of the force travel feel emulator is such that an actuator is integrated and linked to the moving pedal.

The displacement of the brake pedal is given in mm (Millimeter), whereas the force applied to the brake pedal is given in N (Newton).

According to the invention, an interior space of a housing of the device for a brake travel emulator is adapted as a floating device, which acts in its entirety as force generator mentioned. The second component in this entire system is the force sensor, hereinafter also referred to as a load pin unit, which interacts with the force generator and with the static unit as already indicated above.

A connection means connects both components. The connection means is arranged in a middle position, i.e. a center position, arranged between said first component and the second component.

The first component will be described now in more detail as follows.

The device for a brake travel emulator comprises a bush of the connecting rod. The bush is mechanical connection means to the brake pedal arrangement.

At one end, the connecting rod protrudes from a bellow component. The other end of the connecting rod engages with the sliding element.

At the end of the connecting rod engaging with the sliding element, there is a damper component which interacts with a hard rubber stopper. The rubber stopper is arranged at the bottom side of the floating device. The damper component is made up of soft material which is designed to absorb full travel sound and also provide a sharp feedback force increase in the last few millimeters of travel of the brake pedal.

Said bellow component is fixed to the floating device. It preferably covers the top of the floating device. It is preferably made of a soft material.

The floating device receives the sliding element and at least one compression spring as well as a connection means.

At its upper end the compression spring receives the sliding element and is fixed at the bottom end of the floating device. The fixing can occur in various ways, for instance directly on the bottom plate of the floating device or indirectly on the sliding element or at a hard rubber stopper.

The embodiment providing at least one hard rubber end stop ensures a minimized block and return force generated sound, i.e. the end stop lowers sound frequency and therefore increase the quality perception.

The force of a foot of the driver on the brake pedal pushes the connecting rod downward, simultaneously pressing the sliding element against the compression spring.

Preferably, the at least one compression spring has a conical configuration with varying diameter and with varying pitch along its length. The greater the diameter of the compression spring, the smaller is the compression force of the compression spring. This means that the counteracting spring force of the compression spring reaches its maximum value at the lower end of the compression spring, where the compression spring has its smallest diameter. This is the area which receives the displacement according to a fully pressed or almost fully pressed brake pedal, i.e. this area mirrors the way of the actuated brake pedal when it is pressed fully or almost fully.

Thus, the compression spring ensures the exponentially increasing force with the brake pedal being continuously pushed downward to activate the brake pedal.

The interior parts of the floating device are arranged in a way that the conical compression spring interacts with the sliding component. The interaction takes place when the conical compression spring is compressed by means of the sliding component, which itself is moved downwardly by the connecting rod. The sliding component is constructed in a way that it is capable of conducting an axial movement within the floating device. Within the floating device, the axial movement can be conducted from an upper position to a lower position. The axially sliding component acts on the upper free end of the compression spring, i.e. where the compression spring has its largest diameter.

The functional and/or constructional connection to the brake pedal, which is being activated by the driver's foot, is realized through the above-mentioned connecting rod.

The connecting rod has a varying diameter geometry. At the upper part of the connecting rod adjacent to the brake pedal the connecting rod has a bush interacting with the brake pedal. The middle part of the connecting rod has the form of a cone. Its lower part is arranged at the sliding element. This arrangement can be done in various different manners.

The compression spring may consist of any appropriate material. Preferably, a material should be chosen which is capable of an excess of several million cycles.

In a preferred embodiment the invention provides two conical compression springs which work in parallel and which provide the total force and profile required to achieve the specified force at the foot of the driver. The diameters of either the springs preferably vary in such a way that the inner compression spring can be inserted into the interior space of an outer compression spring, vice versa.

The springs may be preferably designed dissimilar with regard to the material, thickness and number of their windings etc. in order to avoid common mode failure.

Providing two conical springs ensures full redundancy and eliminates common cause mechanical failure in case one of the springs breaks in the due course of its use and thus does not provide any longer a spring force, which can be measured directly by the force sensor, preferably in the configuration of a load pin unit.

Preferably, the floating device comprises a soft rubbery component which is arranged circumferentially relative to the wall of the floating device, but inside of the housing of the floating device. The soft rubbery component acts as a sound damper between the sliding component and the module on the release stroke of the brake pedal.

Preferably at a front side of the floating device showing towards to the bush of the connecting rod, one or more soft rubbery components can be arranged. Said soft rubbery component acts as a sound damper between the sliding element and the displacement sensor on the release stroke.

Preferably, the connecting rod has a middle part in form of the cone combining the bush of the connecting rod and its lower end reaching into the sliding element.

The bellow component surrounds most of the length of the connecting rod. The connecting rod has at least two shoulders adapted to reach into the sliding element when assembled.

The way, the cone of the connecting rod interacts with an oscillating electrical field generating varying eddy currents along the travel of the pedal will be described in more detail as follows. This entire configuration makes up the displacement sensor. The components necessary for this effect will be explained first.

In the upper area of the floating device a cylindrical channel is provided which circumferentially surrounds the connecting rod which is freely movable within this cylindrical channel. The cylindrical channel is formed by a corresponding opening of the at least one PCB.

Planar coils are preferably etched directly on the PCB.

The PCB as well as the planar coils form an opening, which makes up the cylindrical channel so that the connecting rod is freely axially movable downwards and upwards within this channel.

Preferably, there are numerous layers of planar coils; this configuration leads to a higher accuracy of the function of the entire displacement sensor.

Preferably at least two PCBs are arranged. Said PCBs can be positioned one on top of the other, namely a first upper PCB and a second lower PCB. The second lower PCB can be intended for redundancy purposes; additionally it increases the signals of the displacement of the connection rod to be measured.

The PCBAs and/or PCBs mentioned can be freely chosen by the man skilled in the art depending on the specific requirements to be fulfilled by the device. Therefore, by way of an example, it may be noted that the PCBs can be adapted as one of the ASIL A, ASIL B, ASIL C etc. types. The PCBs may be carried by any appropriate body, which surrounds the cylindrical channel.

The displacement sensor works with the above-mentioned parts as follows.

The planar coils generate an overall electric field. This is principally known in the state of the art and will thus not be described in detail. The electrical field comes hereby into existence by the function of the oscillating means, which creates an oscillator circuit. Also this is principally known in the state of the art.

As already mentioned, the connecting rod has a varying geometry. The connecting rod preferably has the form of a cone. It influences the electric field coming into existence by the oscillating means, when the connecting rod moves axially downwards and upwards.

The connecting rod compresses the compression spring in the cylindrical channel. The compression spring is hereby moving towards the bottom of the floating device, where the hard rubber stopper is positioned. The connecting rod eventually touches the hard rubber stopper via the damper component; this being the end of the moving of the brake pedal when activated by the driver's foot. This is also the end of the movement of the connecting rod and limits the compression of the at least one compression spring.

This means that the displacement which takes place when the compression spring is being compressed can be directly measured using eddy current sensing. The displacement sensor around the moving cone produces a very stable position output irrelevant of a movement and vibrations in all other directions.

Also the displacement of the connecting rod relative to the displacement sensor leads to a contactless actuation using eddy current, which is a decisive advantage of the present invention.

In addition, this configuration renders it possible to continuously increase diagnostics within each independent micro-controller during the entire life time of the system by updating the system with the latest software versions, especially enabling future speed actuation and algorithms.

In addition, the displacement sensor may comprise additional features of electronic protection and external resources of any kind in order to enhance the sensing system.

The contactless education using eddy currents delivers a signal resulting in the brake force applied to this specific brake. Thus, the system represents the linkage between the vehicle's brake pedal and the components of the brake at the wheel itself.

Since the "quasi" floating device is a rigid element the force provided by compressing the compression spring is being transferred to the means for receiving the force applied which surrounds the body of the force sensor i.e. the load pin unit, via the connecting means. The connecting means is arranged between the exterior side of the bottom of the floating device and the exterior of the load pin unit. The connecting means as well as the means for receiving the force applied can be one single component; most preferably there are two components, which are arranged close together.

The function of the load unit and its interaction with the components of the floating device described above will be explained in more detail below.

The load pin unit comprises means for receiving force applied by the brake pedal onto the connecting rod which is further transferred through the compression spring to the connecting means. Preferably, the connecting means can have of the shape of a ring. In the assembled state of the brake travel emulator the load pin unit can extend through the ring-like connecting means.

At the bottom end of the brake force-travel emulator, the load pin unit comprised a carrier for the PCB. Adjacent to the load pin unit at least one ring seal can be arranged to seal the interior of the load pin unit.

The load pin unit comprises also preferably at least two flux gates, which are arranged on both sides of the means for receiving force applied, which preferably extend circumferentially around the load pin unit at its middle.

The load pin unit is part of the force sensor. The load pin unit is connected to the floating device by the connecting means of the brake travel emulator. Adjacent to the connecting means there is arranged the bottom of the floating device.

Opposite to the bottom of the floating device, the load pin unit carries on both of its sides at least one magnetic strip generated by at least coils arranged at each side of the load pin unit, looking at the circumferentially arranged means for receiving force supplied. Preferably, the load pin unit is adapted as a steel housing.

The PCBs are equipped with flux gates.

The load pin referred to above unit carries means for receiving force applied. Said means for receiving force applied surrounds the load pin unit and allows to identify a left part and a right part of this load pin unit. Each part of the load pin unit carries first and second coils. This means that the load pin unit comprises at least four coils. Said four coils are applied to the load pin unit in the conventional manner.

The above mentioned force, which originates from the actuating from the brake pedal and its displacement measured with the components of the floating device as described above, results also in a stress force by the parallel compression of the compression spring. This stress force is transferred via the connecting means to the force sensor, preferably load pin unit, which takes up and further processes this force as described above.

Consistent stress results aligned with the flux gates are applied to the load pin unit, maximum values of which are held within material limits. The forces applied to the load pin unit are identical on either sides of a means for receiving the applied force arranged on the load pin unit, because the forces are being transferred symmetrically to the load pin unit.

Varying stress results within the load pin unit can adopt, just by way of an example and not limited to it, values ranging between 0,77854 MPa and 936.844 MPa, therefore, the maximum unit is nearly 1000 N of pedal force.

As already explained, the floating device is a rigid element that transfers the compression spring force to the middle of the load pin unit in such a manner that a microdeformation of the load pin unit occurs.

Thus, stress is applied to the load pin unit, which as a result suffers a micro deformation, whereby it is transformed into sufficient strain that is generated and therefore enables the measuring the force by means of the force sensor.

Varying strain results within the load pin unit can adopt, just by way of an example and not limited to it, values ranging between 3.991e-03 MPa to −1.476e-05 MPa, therefore, the maximum unit is nearly 1000 N of pedal force.

Hence, sufficient strain is generated to measure the force through the load pin unit force sensor, respectively force sensor. The output from the load pin unit is either fed into the displacement sensor, which is made up of at least one PCBA including at least one set of planar coils, oscillator circuit and preferably further processing electronics. In another alternative the output from the load pin unit is communicated directly to another vehicle module.

The displacement sensor at least communicates the position of the brake pedal to the vehicle module with both sets of data. With the additional data from the load pin unit both, the displacement as well as the force data are available and can be put into relation to each other.

Hence, the entire device and the entire process described provide a brake pedal emulator which is capable to fulfill two main issues. On the one hand, the brake pedal emulator is capable of measuring the displacement of the way of a brake pedal when this is being activated by the foot of the driver. On the other hand, the brake pedal emulator is capable of measuring the force applied onto an activated brake pedal.

Both measurements are intended to pass on the desired extent to decelerate the vehicle via the brake pedal to the vehicle's brake itself.

DESCRIPTION OF AN EMBODIMENT

Figure 2:
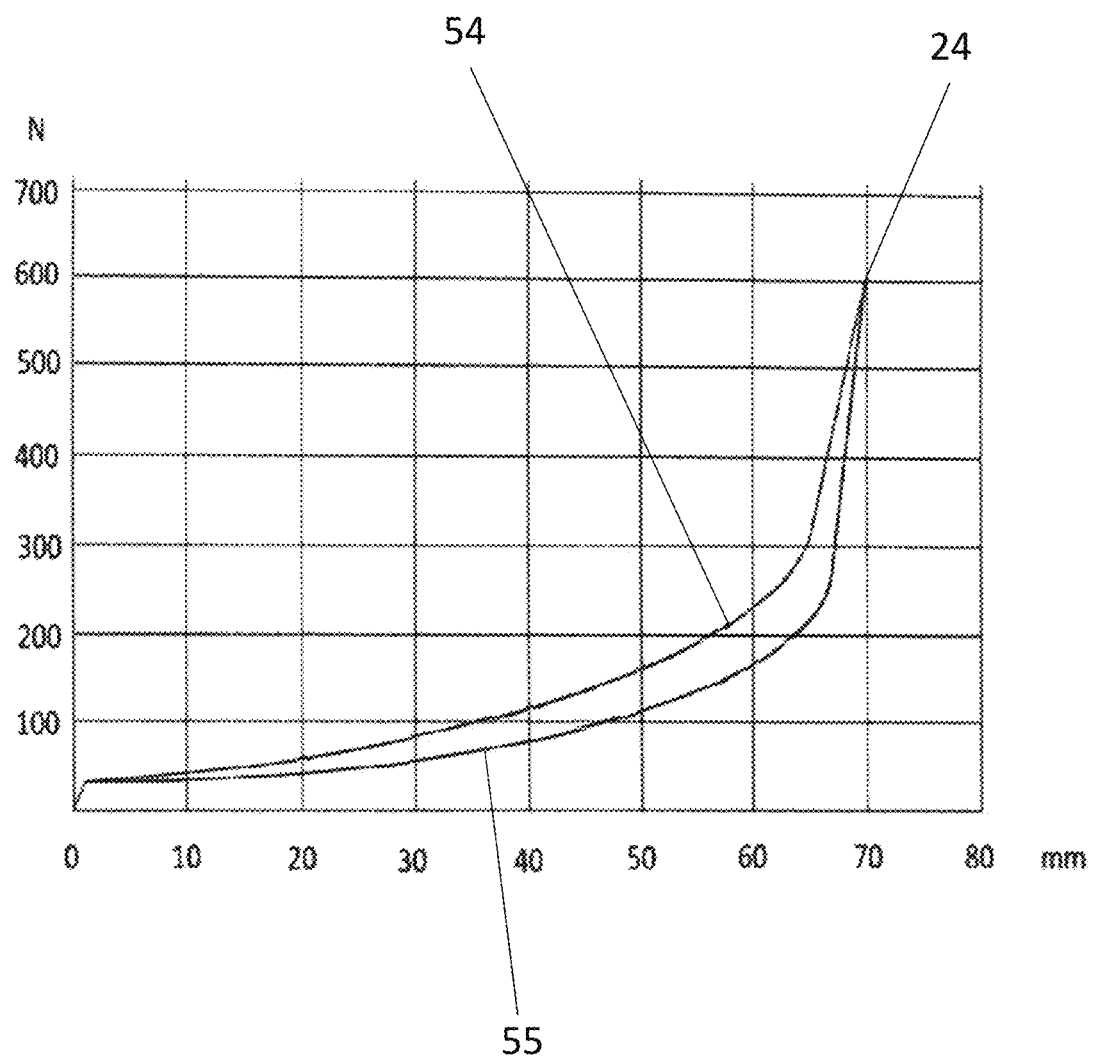
Figure 3:
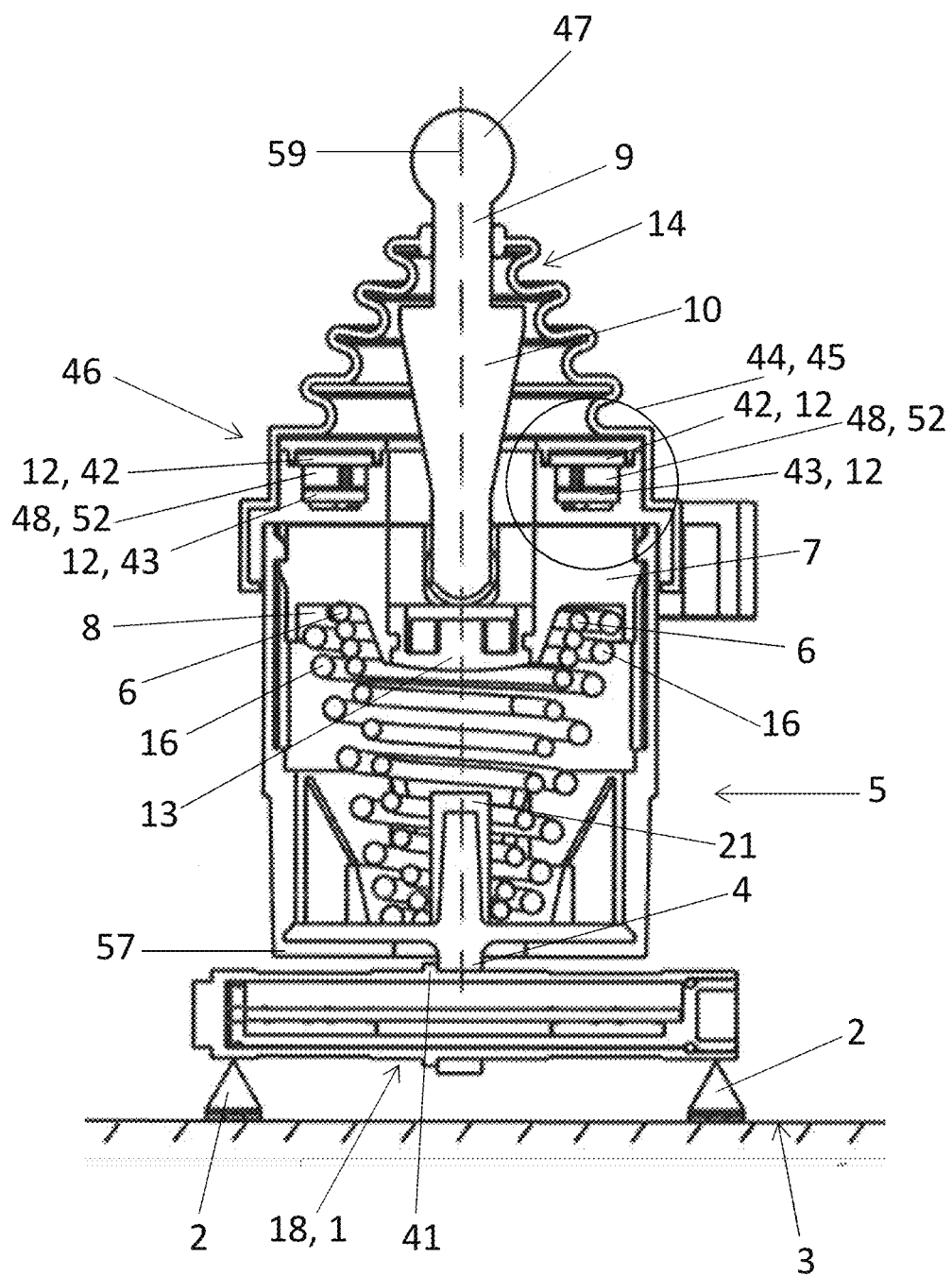
Figure 4:
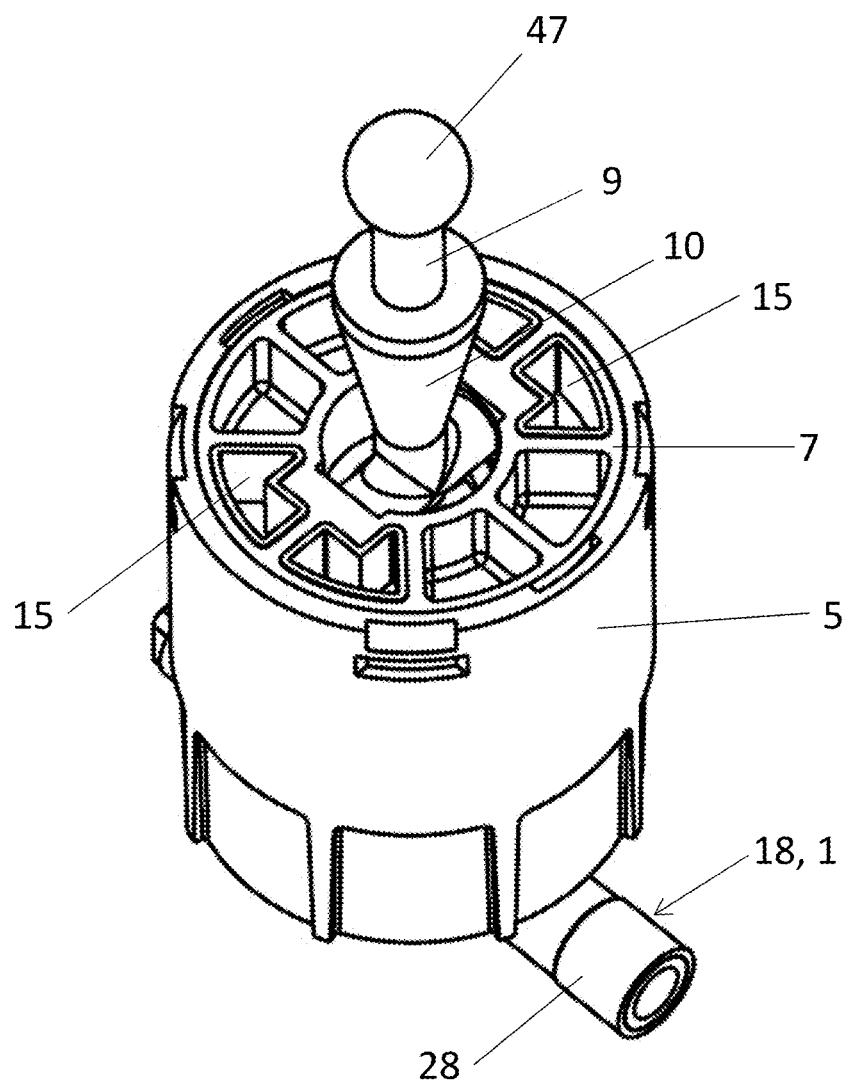
Figure 5:
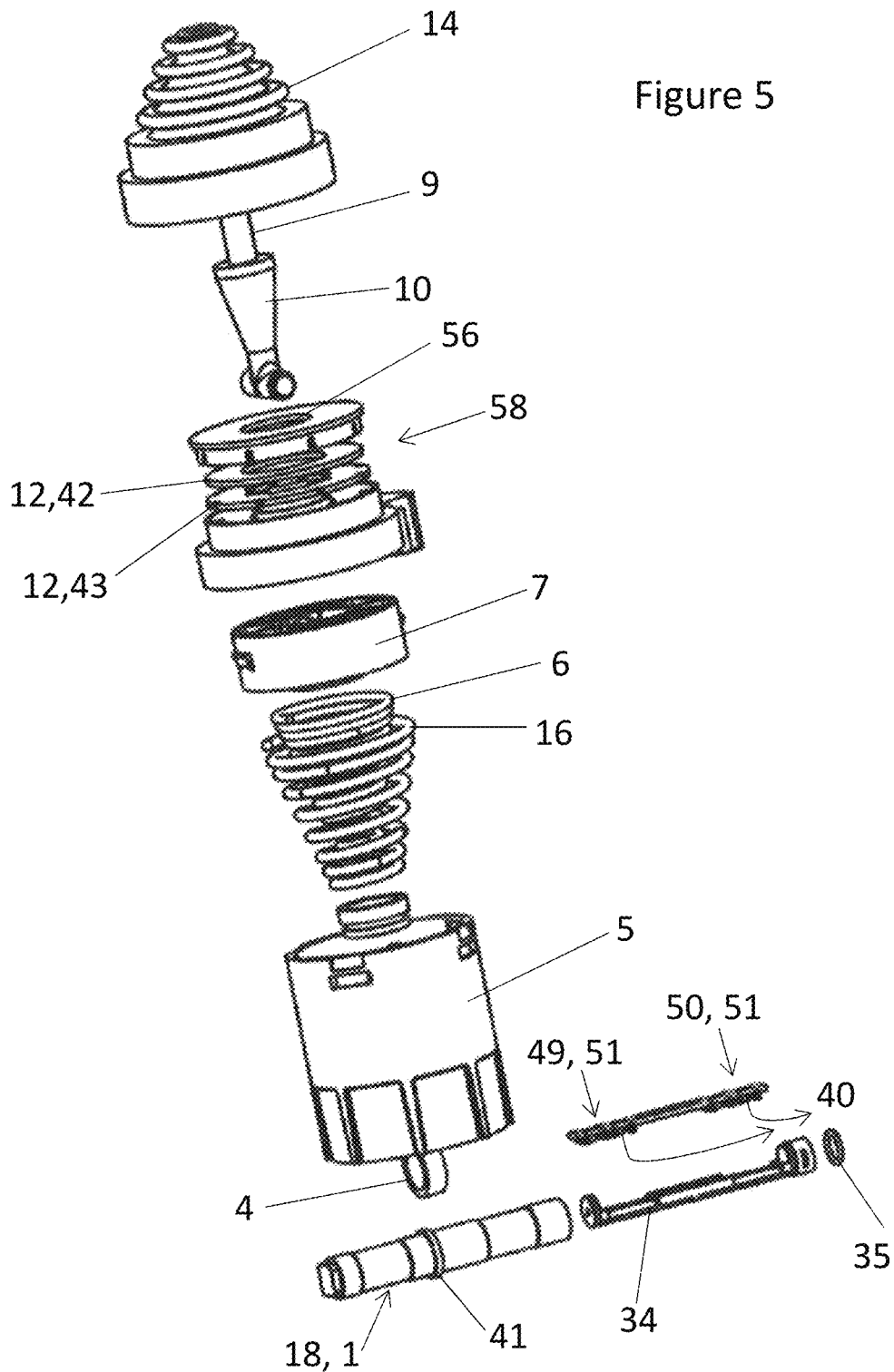
Figure 6:
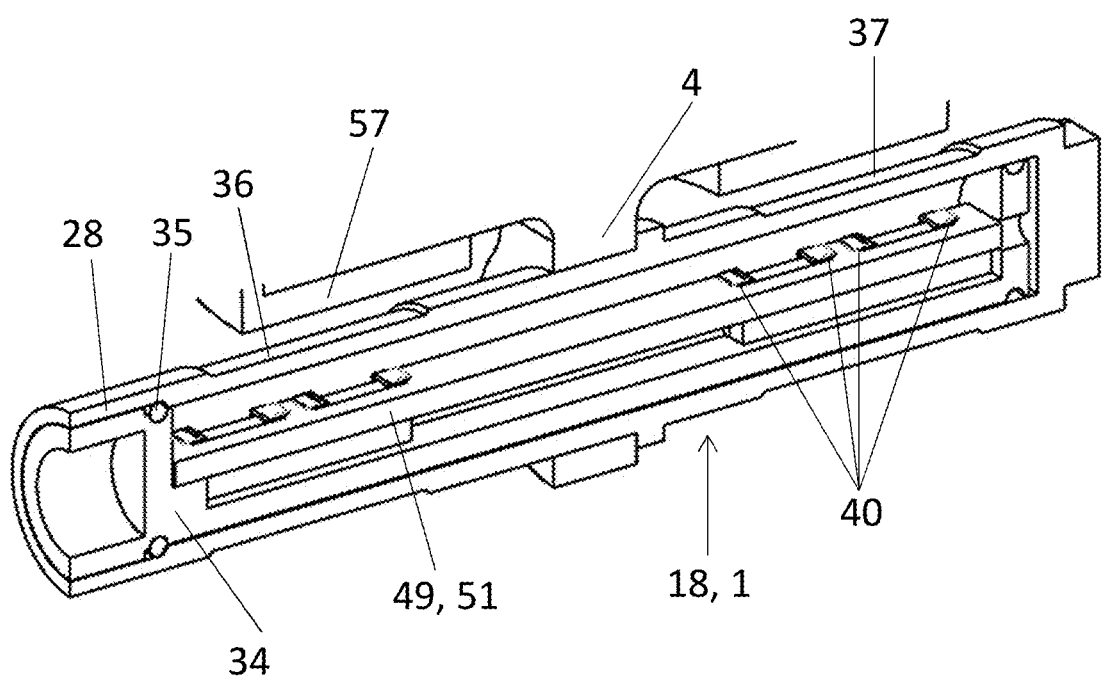
Figure 7:
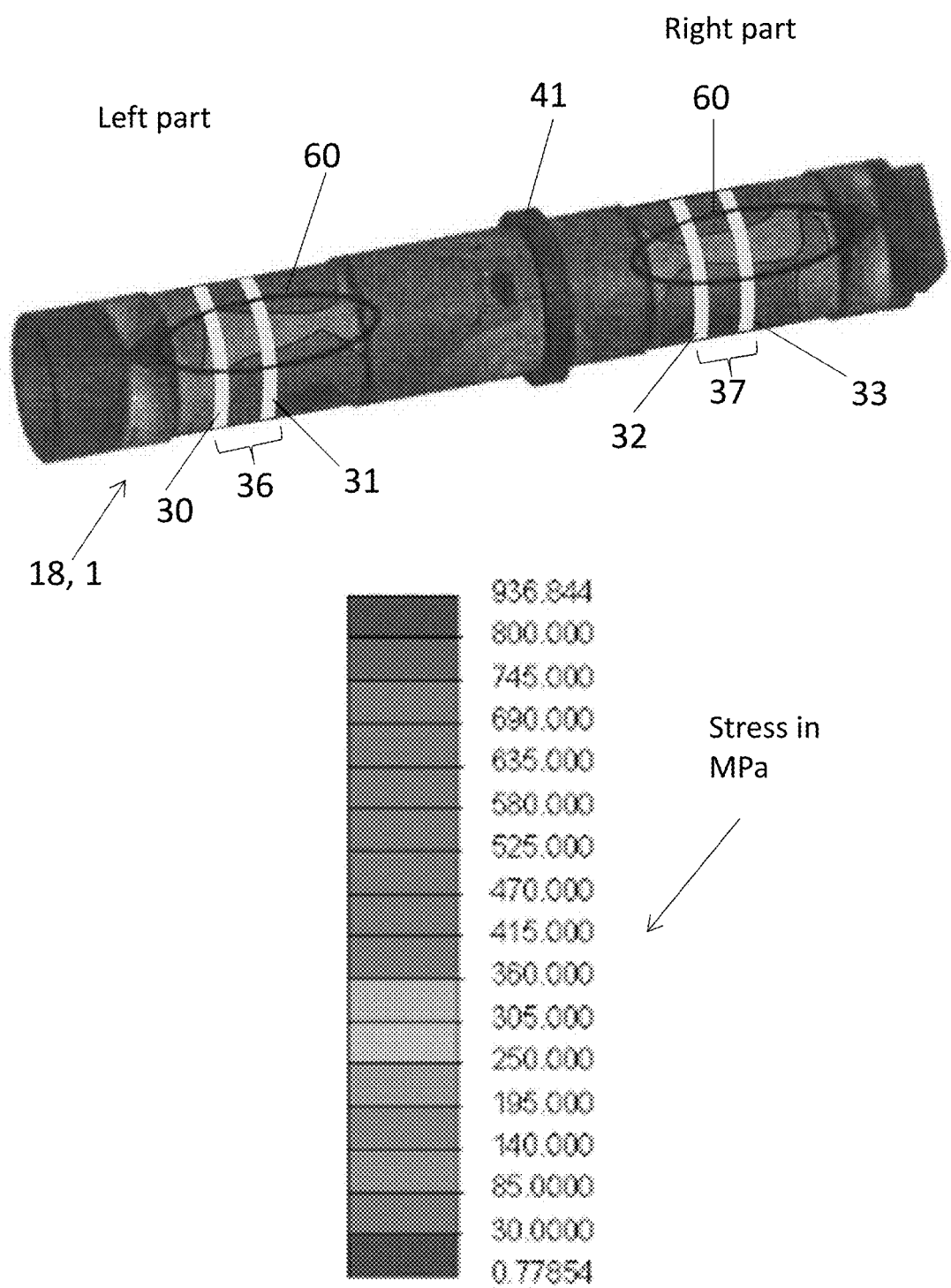
Figure 8:
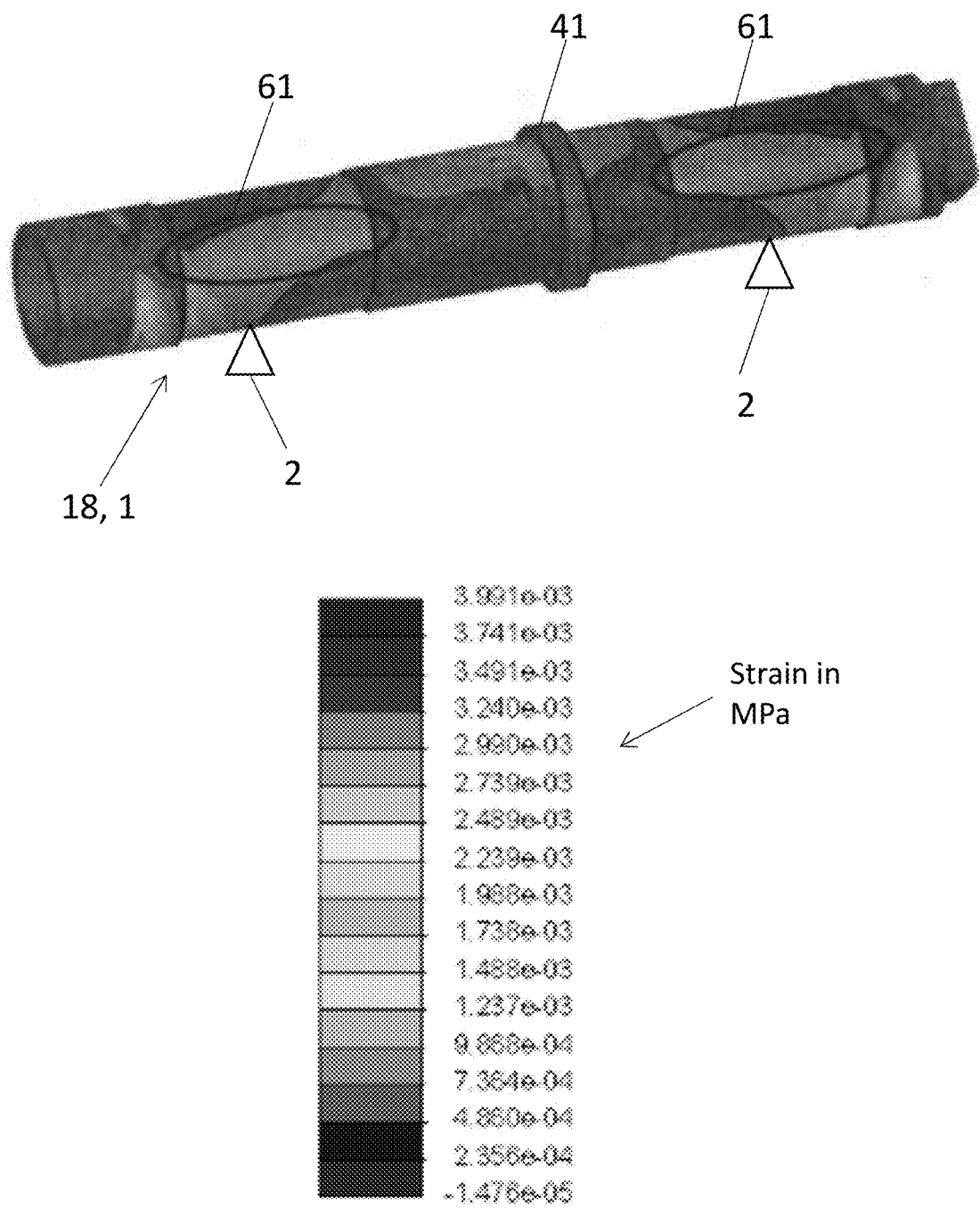

The disclosure includes in further details with respect to exemplified embodiment, to which the invention is of course not restricted, by means of the following figures showing:

FIG. 1: a block diagram of the device with a brake pedal,

FIG. 2: a coordinate system showing curves representing the relationship of the brake pedal displacement relative to the force applied, FIG. 3: a horizontal cut through the brake travel emulator, FIG. 4: perspective view of the floating device, FIG. 5: an explosive view of the brake travel emulator, FIG. 6: a horizontal cut through the load pin unit, FIG. 7: an impact of stress aligned with flux gate locations in the load pin unit and FIG. 8: an impact of strain aligned with flux gate locations in the load pin unit.

The present disclosure relates to a force travel feel emulator with at least one integrated force and/or displacement sensor, preferably with integrated force and displacement sensors. Compared to the state of the art the hydraulic system acting upon the brake pedal is removed. The brake pedal movement and the driver's force applied to the pedal are used to determine the driver's intend to decelerate the vehicle. The corresponding system will be described in more detail now.

FIG. 1 shows a principle block diagram of the set up providing a pre-size pedal feel emulation. The pedal feel emulation is being replicated without having a power brake booster. It allows a direct force sensing including the sensing at an end stop which is shown in FIG. 2. The displacement sensing, i.e. the sensing of the distance travel of the brake pedal, is ensured without redundant outputs.

The radial movement of the brake pedal (17) pivoting around a pivot axis (53) is turned into a linear movement which will be sensed by the force travel feel emulator (20) as described in more detail below.

The distance between the pivot axis (53) and the travel feel emulator (20) is smaller or equal to the distance between the pivot axis (53) and the foot pressing point. When these distances are equal, the driver is activating the emulator directly.

As also can be seen in FIG. 1 the force travel feel emulator (20) comprises a static unit (2) which is arranged below the force sensor (18). The static unit (2) allows the measurement of the physical constraint delivered to the force sensor (18) via the angle defined by the X-axis relative to the Y-axis.

The force sensor (18) may be constructed in any appropriate way. A preferable embodiment shows this sensor as a load pin unit (1).

The constructional arrangement of the force sensor (18) and the static unit (2) is up to the man skilled in the art and may comprise any appropriate technique.

The principle block diagram in FIG. 1 shows providing a force generator which is required to act on the force sensor (18). Since the force has also to vary with the travel of the brake pedal (17) the configuration of the force travel feel emulator is such that an actuator is integrated and linked to the moving pedal which will also be described in more detail below.

The static unit (2) itself is either fixed to a pedal box base (3) or the vehicle floor/firewall panels (not shown).

The force displacement curve is shown in FIG. 2. The X-axis of the coordinate system represents the displacement (22) of the brake pedal (17) in mm, whereas the Y-axis represents the force (23) applied to the brake pedal (17) in N. The upper curve (54) shows the force applied in N whereas the lower curve (55) represents the return force in N. The force displacement curve further on shows the end stop (24) which represents a force near the maximum achievable at the end of the travel of the brake pedal (17).

The invention is not restricted to the values given in FIG. 2 but could exceed them.

The FIG. 3 discloses the principle of the construction and of the functioning of the present invention. It shows two main components which are constructionally and functionally related to each other.

The first component is arranged in the interior space of a housing which will be also described as a floating device (5). The second component is the force sensor (18), hereinafter also referred to as a load pin unit (1), which interacts with the static unit (2) as already indicated above. Both of the components are connected by a connection means (4). The connection means (4) is preferably arranged in the middle position, i.e. center position, between the first component and the second component.

Initially the first component will be described in more detail as follows.

The device for a brake travel emulator of FIG. 3 shows from top to bottom a bush (47) of the connecting rod (9). The connecting rod (9) protrudes from a bellow component (14). The other end of the connecting rod (9) engages with the sliding element (7).

At the lower end of the connecting rod (9) there is preferably a damper component (13) which interacts with a hard rubber stopper (21) which is arranged at the bottom side of the floating device (5). The damper component is made up of soft material which is designed to absorb full travel sound and also provide sharp feedback force increase in the last few millimeters of travel of the brake pedal (17).

Said bellow component (14) is fixed to the floating device (5).

The floating device (5) receives the sliding element (7) and at least one compression spring (6) and a connection means (4).

At its upper end, the compression spring (6) receives the sliding element (7) and is fixed at the bottom end of the floating device (5). The fixing can occur in various ways, for instance directly on the bottom plate of the floating device (5) or indirectly on or at a hard rubber stopper (21).

The embodiment which preferably provides rubber end stops acts in addition to minimize block and return force generated sound, i.e. the end stops lower sound frequency and therefore increase the quality perception.

Upon the force of a foot of the driver the connecting rod (9) is pushed downward, pressing the sliding element (7) against the compression spring (6).

The at least one compression spring (6) has preferably a conical configuration with varying diameter and with varying pitch along its length. The greater the diameter of the compression spring (6) is, the lower is the compression force of the compression spring (6). This means that the counter acting spring force of the compression spring (6) has its maximum value at the lower end of the compression spring (6), where the compression spring (6) has its smallest diameter.

Thus, the compression spring (6) enables the exponentially increasing force with the continuing of the travel of the brake pedal (17) when a foot of the driver activates the brake pedal (17).

The interior parts of the floating device (5) are therefore arranged in a way that the conical compression spring (6) interacts with the sliding component (7). The interaction takes place insofar as the conical compression spring (6) is compressed through the sliding component (7) which is constructed in a way that it is capable of conducting an axial movement within the floating device (5). The movement can be conducted from an upper position to a lower position. The axially sliding component (7) acts on the upper free end (8) of the compression spring (6), i.e. where the compression spring (6) has its largest diameter.

The functional and/or constructional connection to the brake pedal (17), which is being activated by the driver's foot, is realized through the above-mentioned connecting rod (9).

The connecting rod (9) has a varying diameter geometry. At the upper part of the connecting rod (9) adjacent to the brake pedal (17) the connecting rod (9) has a bush (47) interacting with the brake pedal (17). The middle part of the connecting rod (9) has the form of a cone (10) and is arranged at the sliding element (7). This arrangement can be done in various different manners.

The compression spring (6) may consist of any appropriate material. Preferably a material should be chosen which allows for an excess of several million cycles.

In a preferable embodiment the invention provides two conical compression springs (6, 16) which work in parallel and which provide the total force and profile required to achieve the specified force at the foot of the driver. The diameters of both of the springs preferably vary in such a way that the compression spring (6) can be inserted into the interior space of compression spring (16), vice versa.

The springs (6, 16) may be preferably designed similarly with regard to the material, thickness of their windings etc.

Providing two conical springs (6, 16) ensures full redundancy and eliminates common cause mechanical failure in case one of them breaks in the due course of use and thus does not provide any longer a spring force which can be measured directly.

Also preferably the floating device (5) comprises a soft rubbery component (15) which is preferably arranged circumferentially relative to the wall of the floating device (5) and which acts as a sound damper between the sliding component (7) and the module (11) on the release stroke of the brake pedal (17).

The way, the cone (10) of the connecting rod (9) interacts with an oscillating electrical field (45) generating varying Eddy currents (44) along the travel of the pedal will be described in more detail as follows. This entire configuration makes up the displacement sensor (46). The components necessary for this effect will be explained first.

In the upper area of the floating device (5) there is a cylindrical channel (56) which is circumferentially surrounds the connecting rod (9) which is freely movable within this cylindrical channel (56). This cylindrical channel (56) is formed by a corresponding opening of at least one PCB. Planar coils (29) are preferably etched directly on the PCB. The PCB as well as the planar coils (29) form an opening which form the cylindrical channel (56) so that the connecting rod (9) is freely axially movable downwards and upwards within this channel (56).

Preferably, as already mentioned in the part of the brief description of this application, there are numerous layers of planar coils (29); this configuration leads to a higher accuracy of the function of the entire displacement sensor (46).

Preferably there are at least two PCBs, namely a first upper PCB (42) and a second lower PCB (43). The second lower PCB (43) is principally intended for redundancy purposes; additionally it increases the signals of the displacement of the connection rod (9) to be measured. The expression measured equates to the expression sensed.

The PCBAs mentioned can be freely chosen by the man skilled in the art depending on the specific requirements to be fulfilled by the device. Therefore, just as example, it may be noted that the PCBs can be versions of the ASIL A, ASIL B, ASIL C etc. type. The PCBs may be carried by any appropriate body which surrounds the cylindrical channel (56).

The displacement sensor (46) works with the above-mentioned parts as follows.

The planar coils (29) generate an overall electric field. This is principally known in the state of the art and will thus not be described in detail. The expression electric field equates to the expression of the magnetic field. In practice both expressions are used parallel. The electrical field comes hereby to the existence by the function of the oscillating means (48). Also this is principally known in the state of the art.

The connecting rod (9) having a varying geometry, preferably in the form of a cone (10), influences the electric field (45) coming into existence by the oscillating means (48), when the connecting rod (9) moves axially downwards and upwards. For this movement reference number 59 is used. In the cylindrical channel (46) and thereby compressing the compression spring (6) and hereby moving towards the bottom of the floating device (5), where the hard rubber stopper (21) is positioned, and eventually touching this hard rubber stopper (21) via the damper component (13); this being the end of the moving of the brake pedal (17) when activated by the driver's foot as well as being the end of the moving of the connecting rod (9) and being the end of the compression of the at least one compression spring (6).

This means that the displacement which takes place when the compression spring (6) is being compressed can be directly measured using eddy current sensing. The displacement sensor (46) around the moving cone (10) produces a very stable position output irrelevant of a movement and vibrations in all other directions.

Also the displacement of the connecting rod (9) relative to the displacement sensor (46) leads to a contactless actuation using eddy current, which is a decisive advantage of the present disclosure.

In addition, this configuration makes it possible to continuously increase diagnostics within each independent micro-controller during the entire life time of the system by updating the system with the latest software versions, especially enabling future speed actuation and algorithms.

In addition, the displacement sensor (46) may comprise additional features of electronic protection and external resources of any kind in order to enhance the sensing system.

The contactless education using eddy currents delivers a signal resulting in the brake force applied to this specific brake. Thus, the system represents the linkage between the vehicle's brake pedal (17) and the components of the brake at the wheel itself.

Since the "quasi" floating device (5) is a rigid element the force provided by compressing the compression spring (6) is being transferred to the means for receiving the force applied (41) which surrounds the body of the force sensor (18), i.e. the load pin unit (1), via the connecting means (4) which is arranged between the exterior side of the bottom of the floating device (5) and the exterior of the load pin unit (1). The connecting means (4) as well as the means (41) for receiving the force applied can be one single component; most preferably there are two components, which are, however, arranged close together.

The function of the load unit (1) and its interaction with the components of the floating device (5) described above will be explained in more detail below in connection with the discussion of FIG. 6-8.

The FIG. 4 is a perspective view of the floating device (5), the connecting rod (9) protruding from the floating device (5) and the load pin unit (1) to be seen below the floating device (5).

As in the FIG. 3, the load pin unit (1) of the FIG. 4 is held by the connecting means (4) (not shown).

At the front side of the floating device (5) showing towards to the bush (47) one can see the soft rubbery components (15). Said soft rubbery component (15) acts as a sound damper between the sliding element (7) and the displacement sensor (46) on the release stroke.

The connecting rod (9) shown in the FIG. 4 has a middle part in form of the cone (10) combining the bush (47) of the connecting rod (9) and its lower end reaching into the sliding element (7).

The FIG. 5 of the invention shows an exploded view of the device for the brake travel emulator. The following description refers to the individual components of the brake travel emulator from top to bottom relative to FIG. 5.

The bellow component (14) surrounding most of the length of the connecting rod (9) is referred to by reference 14. Below the bellow component (14) one can see the connecting rod (9) reaching into the bellow component (14) from below.

Below the cone (10) the connecting rod (9) has at least two shoulders reaching into the sliding element (7) when assembled.

The assembly (58) below the connecting rod (9) in FIG. 5 shows a stack of individual PCBAs (12, 42, 43) having at least one planar coil (29) each. In the middle of the stack of individual PCBAs (12, 42, 43) one can see the cylindrical channel (56) in which the connecting rod (9) moves axially when assembled.

The stack of individual PCBAs (12, 42, 43) is held by the structural body as explained above.

Below the structural body one can see the floating device (5) comprising of a cylindrical main body and a lid carrying said soft rubbery components (15).

In the assembled state of the brake travel emulator the lid and the cylindrical main body of the floating device (5) are mounted together. In the FIG. 5 the lid of the floating device (5) has a ring-like structure.

To be placed within the cylindrical main body of the floating device (5) one can see two sets of individual compression springs (6). Both compression springs (6) have a conical form, wherein the inner compression spring (6) of smaller diameter is positioned within the outer compression spring (6).

Below the floating device (5) there is a connecting means (4) shown in form of a ring. In the assembled state of the brake travel emulator the load pin unit (1) extends through the ring-like connecting means (4).

The load pin unit (1) comprises means for receiving force applied by the brake pedal (17) onto the connecting rod (9) which is further transferred through the compression spring (6) to the connecting means (4).

At the bottom end of the brake travel emulator FIG. 5 shows the load pin unit (1) and its carrier (34) for the PCB (12, 42, 43) arranged axially next to the load pin unit (1). Adjacent to the load pin unit (1) there is a ring seal (35).

Above the carrier (34) FIG. 5 shows the PCB (49, 51) and (50, 51) which are supported by the carrier (34).

At the side of the PCB (49, 51) and (50, 51) leading away from the carrier (34) one can see flux gates (40).

Now the force sensor (18), i.e. load pin unit (1) are described in more detail. Again, the constructional elements are explained first.

FIG. 6 shows the load pin unit (1) being part of the force sensor (18). The load pin unit (1) is held by the connecting means (4) of the brake force-travel emulator. Adjacent to the connecting means (4) there is arranged the bottom (57) of the floating device (5).

Opposite of the bottom (57) of the floating device (5) the load pin unit (1) carries at least one magnetic strip (36, 37) generated by the oscillating means (48) (not shown).

In the FIG. 6, the load pin unit (1) is adapted as a steel housing (28). In the same manner as already explained with regard to FIG. 5, the load pin unit (1) houses the carrier (34) supporting the PCBs (49, 51) and (50, 51).

The PCBs (49, 51) and (50, 51) are equipped with flux gates (40).

The load pin unit (1) shown in FIG. 7 carries means for receiving force applied (41). This means for receiving force applied (41) surrounds the load pin unit (1) and defines a left part and a right part of this load pin unit (41). Each part of the load pin unit (41) carries first and second coils (left: 30, 31), (right: 32, 33). This means that the load pin unit (1) comprises at least four coils. These coils are applied to the load pin unit (1) in the conventional manner.

The four coils (left: 30, 31), (right: 32, 33) are surrounded circumferentially by magnetic strips (36, 37). As can be seen from the oval (60) on both sides of the load pin unit (1) this is the area which is effected by the force applied through the movement of the brake pedal (17) and which is transferred by the above-mentioned configuration of the compression of the compression spring (6) via the connecting means (4) respectively means (41) for receiving force applied to the load pin unit (1) and which is aligned with the locations of the flux gates (40) described with regard to FIG. 6.

FIG. 7 shows the consistent stress results aligned with the flux gates (40) with maximum values within material limits. The forces applied to the load pin unit (1) are on its left side and on its right side in most cases identical because the forces are being transferred symmetrically as described above.

The column in FIG. 7 shows varying stress results within the load pin unit (1) in MPa. The maximum unit according to this example is nearly 1000 N of pedal force.

FIG. 8 describes the configuration according to FIG. 7. However, it does not show the stress results but the strain results. In addition, it shows the arrangement of the load pin unit (1) connected to the static unit (2).

The column in FIG. 8 discloses the achievable varying strain results analogue to the explanation with regard to FIG. 7.

Since the floating device (5) is, as already explained, a rigid element that transfers the compression spring (6) force to the middle of the load pin unit (1) in such a manner that a micro-deformation of the load pin unit (1) occurs, sufficient strain is generated to measure the force through the load pin unit (1) force sensor (49, 51), respectively force sensor (50, 51). The output from the load pin unit (1) is either fed into the displacement sensor (46), which is made up of at least one PCBA (12, 42, 43) including at least one set of planar coils (29), oscillator circuit (48, 52) and preferably further processing electronics, or the output from the load pin unit (1) is communicated directly to another vehicle module.

The displacement sensor (46) at least communicates the position of the brake pedal (17) to the vehicle module with both sets of data, i.e. with the additional data from the load pin unit (1) both, the displacement as well as the force data are available and can be put into relation to each other as shown in FIGS. 1 and 2.

Hence, the entire device and the entire process described above provide a brake pedal emulator which is capable to fulfill two main issues. On the first side it is capable to measure the displacement of the way of a brake pedal when this is being activated by the foot of the driver. Simultaneously, it is capable to measure the force applied onto an activated brake pedal.

Both measurements are meant to pass on the intended extent to decelerate the vehicle via the brake pedal to the vehicle's brake itself.

REFERENCE NUMBERS

1 Load pin unit
2 Static unit
3 Box base
4 Connection means
5 Floating device
6 Compression spring
7 Sliding element
8 Free end of compression spring
9 Connection rod
10 Cone
11 remains free 12 PCBA
13 Damper component
14 Bellow component
15 Soft rubbery component
16 Further compression spring
17 Brake pedal
18 Force sensor
19 Base of pedal
20 Force travel feel emulator
21 Hard rubber stopper
22 Displacement
23 Force
24 End stop
25 Displacement sensor 1
26 Displacement sensor 2
27 Oscillator 1
28 Steel housing
29 Planar coils
30 First (left) coil
31 Second (left) coil
32 First (right) coil
33 Second (right) coil
34 Carrier for PCB
35 Ring seal
36 First magnetic strip left
37 Second magnetic strip right
38 First load pin part
39 Second load pin part
40 Flux gates
41 Means for receiving force applied
42 First upper PCB
43 Second lower PCB
44 Eddy current
45 Electrical field
46 Displacement sensor
47 Bush
48 Oscillating means
49 Micro-controller left
50 Micro-controller right
51 PCB to micro-controller 49, 50
52 Oscillator circuit
53 Pivot axis
54 Upper curve
55 Lower curve
56 Cylindrical channel
57 Bottom of 5
58 Assembly
59 Axial line of movement
60 Area of stress results
61 Area of strain results

The invention claimed is:

1. A device for a brake travel emulator, the device comprising:
a housing (5) and a force sensor (18), the housing (5) being connected to a middle part of the force sensor (18) via a connection means (4), the force sensor (18) being arranged at a static unit (2), the housing (5) further comprising at least one conical compression spring (6), an axially sliding component (7), a connecting rod (9) with a varying cross-sectional geometry along a length of the connecting rod (9), a oscillating means (48) adapted and configured to create an electric field, wherein the connecting rod (9) and the oscillating means (48) cooperate together to form a displacement sensor (46) of the housing, the force sensor (18) further comprising, a micro-controller (50), means for receiving applied force (41) and at least four coils (30, 31, 32, 33).

2. A device according to claim 1, wherein the displacement sensor (46) comprises at least a PCBA (12) including at least one set of planar coils (29) and at least one oscillator (52) circuit.

3. A device according to claim 1, wherein the force sensor (18) is configured as a load pin unit (1).

4. A device according to claim 3, wherein the load pin unit (1) comprises two load parts (38, 39).

5. A device according to claim 1, wherein the four coils (30, 31, 32, 33) form at least two magnetic strips (36, 37).

6. A device according to claim 1, wherein the force sensor (18) is made of heat treated stainless steel.

7. A device according to claim 1, wherein the force sensor (18) comprises a steel housing (33) and a carrier (34) for the micro controller (50).

8. A device according to claim 1, wherein the force sensor (18) is hermetically sealed with one of a fly-lead and integrated sealed connector.

9. A device according to claim 1, wherein the force sensor (18) comprises at least two flux gates (40) as sensing heads.

10. A device according to claim 1, wherein the at least one conical compression spring (6) has a varying pitch.

11. A device according to claim 1, wherein the housing (5) comprises at least one further compression spring (16).

12. A device according to claim 1, wherein the varying geometry of the connection rod (9) comprises a cone shape (10).

13. A device according to claim 1, wherein the sliding element (7) includes a damper component (13) comprised of a soft material.

14. A device according to claim 1, wherein the housing (5) comprises a collapsible hard stopper rubber (21).

15. A device according to claim 1, wherein the connecting rod (9) and the sliding element (7) are adapted and configured for a linear movement within the housing (5), and the displacement sensor (46) is adapted and configured to sense the linear movement of the connecting rod (9) and the sliding element (7) through a uniform oscillating field around the connecting rod (9) and the sliding element (7).

16. A device according to claim 1, wherein the device is configured to transfer the force of the at least one conical compression spring (6) to the middle of the force sensor (18) in such a way that the force sensor (18) deforms with sufficient strain so as to allow measurement of the force with the force sensor (18).

17. A device according to claim 1, wherein the varying cross-sectional geometry of the connecting rod (9) is configured to interact with the electric field generated by the oscillating means (48) and varying eddy currents generated along the travel of a brake pedal (17) enabling the displacement sensor (46) to provide a linear position output during moving of the at least one conical compression spring (6).

18. A device according to claim 1, wherein:
the device is operatively connected to a brake pedal with the axially sliding component (7) operatively connected to the brake pedal (17) through the connecting rod (9), the length of the connecting rod (9) corresponds to a full length of travel of the brake pedal (17), and the device is configured and adapted to sense a displacement of the brake pedal and sense a force applied on the brake pedal by a user, such that when the force is applied on the brake pedal (17) by the user:
the axially sliding component (7) acts on a free end (8) of the at least one conical compression spring (6) and compresses the at least one conical compression spring (6), the at least one conical compression spring generates exponentially increasing force with travel of the brake pedal (17) as the at least one conical compression spring is compressed, the exponentially increasing force is transmitted to the applied force receiving means (41) and the force sensor (18), the force sensor (18) deforms with sufficient strain to enable measurement of the force with the force sensor (18), the varying cross-sectional geometry of the connecting rod (9) is adapted to interact with an oscillating electrical field and generates varying eddy currents along the length of travel of the brake pedal (17) enabling the displacement sensor (46) to produce a linear position output during moving of the at least one conical compression spring (6).

19. A device according to claim 18, wherein an output from the force sensor (18) is directed to the displacement sensor (46).

20. A device according to claim 18, wherein an output from the force sensor (18) is directed to a vehicle module.

\* \* \* \* \*